United States Patent
Katori (10) Patent No.: US 11,017,808 B2
(45) Date of Patent: May 25, 2021

(54) FRACTIONATION METHOD FOR MAGNETIC RECORDING-MAGNETIC POWDER, FRACTIONATION APPARATUS FOR MAGNETIC RECORDING-MAGNETIC POWDER, AND METHOD OF PRODUCING MAGNETIC RECORDING MEDIUM

(71) Applicant: SONY CORPORATION, Tokyo (JP)

(72) Inventor: Kenji Katori, Kanagawa (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 15/765,416

(22) PCT Filed: Oct. 27, 2016

(86) PCT No.: PCT/JP2016/004729
§ 371 (c)(1),
(2) Date: Apr. 2, 2018

(87) PCT Pub. No.: WO2017/081848
PCT Pub. Date: May 18, 2017

(65) Prior Publication Data
US 2018/0308516 A1    Oct. 25, 2018

(30) Foreign Application Priority Data

Nov. 12, 2015 (JP) .............................. JP2015-222234

(51) Int. Cl.
*G11B 5/714* (2006.01)
*G11B 5/845* (2006.01)
(Continued)

(52) U.S. Cl.
CPC .......... *G11B 5/714* (2013.01); *G11B 5/70678* (2013.01); *G11B 5/73* (2013.01);
(Continued)

(58) Field of Classification Search
CPC .......... B03C 1/027; B03C 1/029; B03C 1/03; B03C 1/28; B03C 1/288; B03C 2201/18;
(Continued)

(56) References Cited

U.S. PATENT DOCUMENTS 4,290,528 A * 9/1981 Stekly .................... B01D 35/06
209/223.1
6,129,847 A * 10/2000 Wunsch .................. B29B 17/02
134/10
(Continued)

FOREIGN PATENT DOCUMENTS

JP    2003-022510 A    1/2003
JP    2006-501662 A    1/2006
(Continued)

OTHER PUBLICATIONS

International Search report issued in connection with International Patent Application No. PCT/JP2016/004729, dated Dec. 13, 2016. (2 pages).

*Primary Examiner* — David C Mellon
(74) *Attorney, Agent, or Firm* — K&L Gates LLP (57) ABSTRACT

A fractionation method for magnetic recording-magnetic powder is provided. The method includes applying a magnetic field to a liquid that contains magnetic recording-magnetic powder dispersed therein, wherein the liquid is stored in a storage unit relatively shifting a position where the magnetic field is applied to the liquid; and separating the storage unit into two parts after the shift.

10 Claims, 5 Drawing Sheets

(51) Int. Cl.
 G11B 5/842 (2006.01)
 H01F 41/16 (2006.01)
 G11B 5/706 (2006.01)
 G11B 5/73 (2006.01)
(52) U.S. Cl.
 CPC .............. *G11B 5/842* (2013.01); *G11B 5/845* (2013.01); *H01F 41/16* (2013.01)
(58) Field of Classification Search
 CPC ............ B03C 2201/20; B03C 2201/22; G11B 5/70678; G11B 5/714; G11B 5/73; G11B 5/842; G11B 5/845; G11B 5/852; H01F 41/16
 See application file for complete search history.

(56) References Cited

U.S. PATENT DOCUMENTS

| | | |
|---|---|---|
| 2006/0177879 A1 | 8/2006 | Mayes et al. |
| 2010/0081011 A1 | 4/2010 | Nakamura |

FOREIGN PATENT DOCUMENTS

| | | |
|---|---|---|
| JP | 2010-102818 A | 5/2010 |
| JP | 2014-011360 A | 1/2014 |
| JP | 5737795 A | 6/2015 |

* cited by examiner

FRACTIONATION METHOD FOR MAGNETIC RECORDING-MAGNETIC POWDER, FRACTIONATION APPARATUS FOR MAGNETIC RECORDING-MAGNETIC POWDER, AND METHOD OF PRODUCING MAGNETIC RECORDING MEDIUM

CROSS-REFERENCE TO RELATED APPLICATIONS

The present application claims the benefit of International Application No. PCT/JP2016/004729, filed Oct. 27, 2016, which claims priority to Japanese Application No. 2015-222234, filed Nov. 12, 2015, the disclosures of which are incorporated herein by reference.

BACKGROUND

The present technology relates to a fractionation method for magnetic recording-magnetic powder, a fractionation apparatus for magnetic recording-magnetic powder, and a method of producing a magnetic recording medium.

Magnetic recording-magnetic powder is required to have a particle size at least half of a recording wavelength or less. However, a small particle size causes a phenomenon called superparamagnetism, which rapidly degrades magnetic characteristics along with a decrease in particle size (see FIG. 6). Therefore, if magnetic powder contains a large number of superparamagnetic particles, characteristics of the magnetic powder may be degraded in whole. Accordingly, there is a demand for a technique of reducing superparamagnetic particles contained in magnetic powder.

Patent Document 1 describes a technique for classifying magnetic powder depending on particle sizes, using a hydraulic cyclone. Patent Document 2 describes a technique in which classified magnetic powder is used for a magnetic recording medium. Furthermore, with regard to the term "classify", World Encyclopedia 2nd edition, for example, defines the term as to separate powder and granular materials depending on particle sizes, using fluid force.

SUMMARY

Problems to be Solved by the Invention

However, it is difficult to reduce superparamagnetic particles from magnetic powder by classification in which the magnetic powder is sorted depending on particle sizes.

An object of the present technology is to provide a fractionation method for magnetic recording-magnetic powder and a fractionation apparatus for magnetic recording-magnetic powder capable of reducing superparamagnetic particles from magnetic recording-magnetic powder, and a method of producing a magnetic recording medium.

Solutions to Problems

In order to solve the above problem, a first technology is a fractionation method for magnetic recording-magnetic powder, the method including: applying a magnetic field to a liquid that contains magnetic recording-magnetic powder dispersed therein; and relatively shifting a position where the magnetic field is applied to the liquid.

A second technology is a fractionation apparatus for magnetic recording-magnetic powder, the apparatus including: a storage unit configured to store a liquid that contains magnetic recording-magnetic powder dispersed therein; a magnetic field application unit configured to apply a magnetic field to the liquid; and a shifting unit configured to shift at least one of the storage unit and the magnetic field application unit so as to relatively shift a position where the magnetic field is applied to the liquid.

A third technology is a fractionation apparatus for magnetic recording-magnetic powder, the apparatus including: a magnetic field application unit configured to apply a magnetic field to a liquid that is stored in a storage unit and that contains magnetic recording-magnetic powder dispersed therein; and a shifting unit configured to shift at least one of the storage unit and the magnetic field application unit so as to relatively shift a position where the magnetic field is applied to the liquid.

A fourth technology is a method of producing a magnetic recording medium, the method including: applying a magnetic field to a liquid that contains magnetic recording-magnetic powder dispersed therein; relatively shifting a position where the magnetic field is applied to the liquid; extracting part of the liquid that remains at the position after the shift where the magnetic field is applied; and forming a magnetic layer using the magnetic recording-magnetic powder contained in the extracted liquid.

In the first and fourth technologies, it is preferable that the method further includes extraction of part of the liquid that remains at the position after the shift where the magnetic field is applied. It is more preferable that the method further includes separation of part of the liquid so that the part includes the liquid at the position after the shift where the magnetic field is applied; and extraction of part of the liquid after the separation.

In the first and fourth technologies, the liquid is preferably stored in the storage unit including at least a first chamber and a second chamber, and the shift of the position where the magnetic field is applied is preferably a shift from the first chamber to the second chamber. In this case, it is preferable that the method further includes separation of the first chamber and the second chamber after the shift; and extraction of a liquid in the second chamber.

In the first and fourth technologies, the liquid is preferably stored in the storage unit, and the shift is preferably a shift from one end to another end of the storage unit.

In the first and fourth technologies, the magnetic field is preferably applied by a magnetic field application unit held obliquely with respect to a direction of the shift.

In the first and fourth technologies, the magnetic field at a time of the shift is preferably equal to or higher than an external magnetic field worth of 1/20 of coercive force Hc of the magnetic recording-magnetic powder and equal to or lower than an external magnetic field worth of coercive force Hc of the magnetic recording-magnetic powder.

In the first and fourth technologies, the magnetic field is preferably an AC magnetic field.

In the first and fourth technologies, the AC magnetic field at a time of the shift preferably has a frequency of 0.1 Hz or more and 100 Hz or less.

In the first and fourth technologies, the magnetic recording-magnetic powder is preferably hexagonal ferrite magnetic powder.

In the second technology, the storage unit is preferably configured to be separable at a part of the storage unit, and the shifting unit is preferably configured to shift the position where the magnetic field is applied from an outer side of the part of the storage unit to the part of the storage unit. In this case, it is preferable that the apparatus further includes a discharging unit configured to discharge a dispersion liquid in the part of the storage unit.

In the second technology, it is preferable that the storage unit includes at least a first chamber and a second chamber, and the shifting unit shifts the position where the magnetic field is applied from the first chamber to the second chamber.

In the second and third technologies, the storage unit preferably has a cuboid shape or a cylindrical shape.

In the third technology, the magnetic field application unit is preferably held obliquely with respect to a direction of the shift, so that the position where the magnetic field is applied shifts from one end to another end of the storage unit along with the shift.

Effects of the Invention

As described above, according to the present technology, it is possible to reduce superparamagnetic particles from magnetic recording-magnetic powder.

DETAILED DESCRIPTION

With reference to the drawings, embodiments of the present technology will be described in the following order. Furthermore, in all the drawings relating to the embodiments below, the same reference numerals denote the same or corresponding parts.

1 First Embodiment (an example of a fractionation apparatus and a fractionation method for magnetic recording-magnetic powder (hereinafter simply referred to as "magnetic powder"))

2 Second Embodiment (examples of a fractionation apparatus and a fractionation method for magnetic powder)

3 Third Embodiment (examples of a fractionation apparatus and a fractionation method for magnetic powder)

4 Fourth Embodiment (an exemplary method of producing magnetic recording medium)

1 First Embodiment (Fractionation Apparatus for Magnetic Powder)

Figure 1:
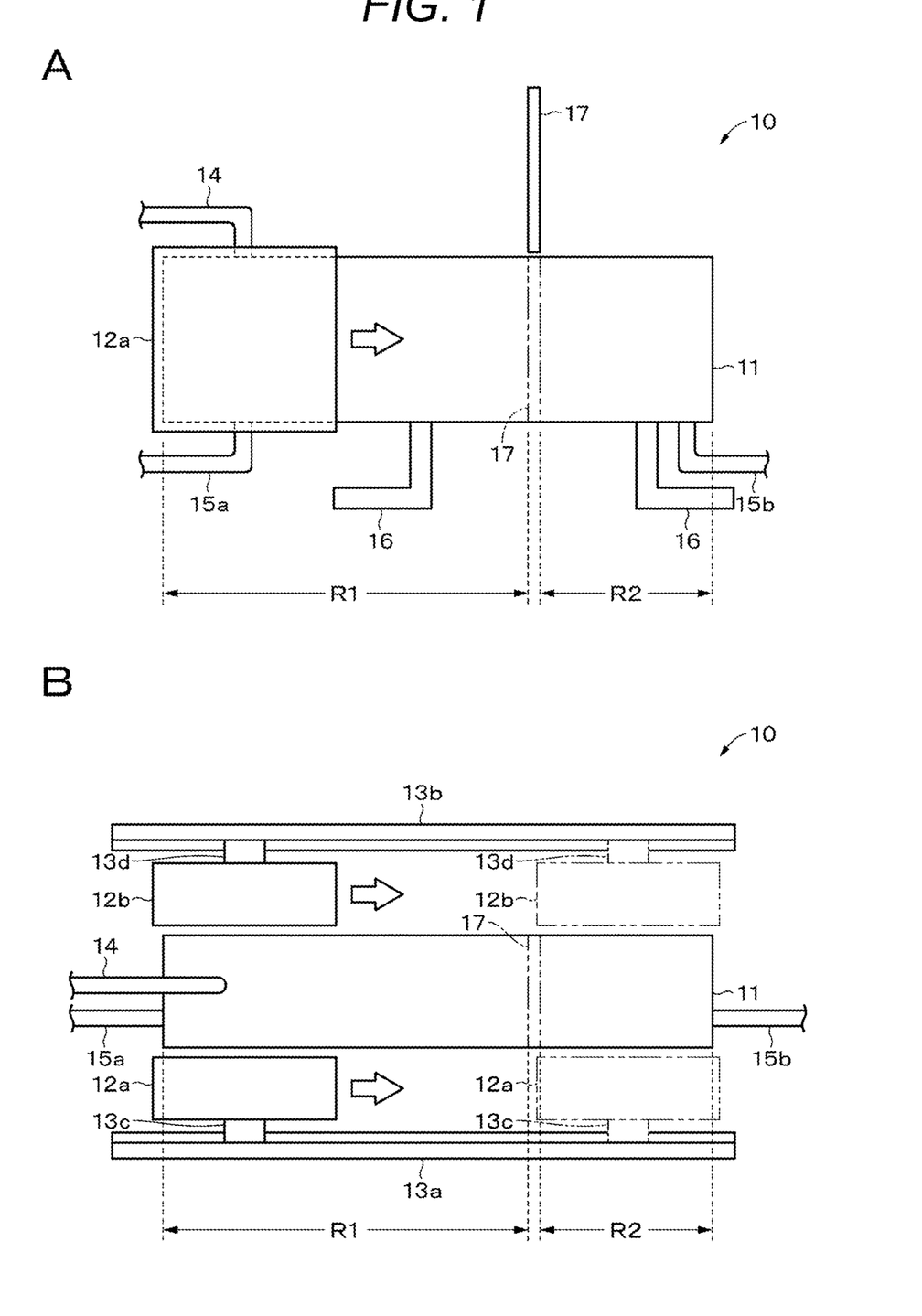
FIG. 1A is a side view showing a configuration example of a fractionation apparatus for magnetic recording-magnetic powder according to a first embodiment of the present technology.
FIG. 1B is a top view showing a configuration example of the fractionation apparatus for magnetic recording-magnetic powder according to the first embodiment of the present technology.

As shown in FIGS. 1A and 1B, a fractionation apparatus 10 for magnetic powder according to a first embodiment of the present technology includes a storage unit 11 which stores a dispersion liquid; a pair of magnetic field application units 12a and 12b which applies a magnetic field to the dispersion liquid stored in the storage unit 11; shifting units 13a and 13b which shift the magnetic field application units 12a and 12b so as to shift positions where the magnetic field is applied to the dispersion liquid; a feeding unit 14 which feeds the dispersion liquid to the storage unit 11; discharging units 15a and 15b which discharge the dispersion liquid; and a supporting unit 16 which supports the storage unit 11. It should be noted that the shifting units 13a and 13b are not shown in FIG. 1A. The magnetic field application units 12a and 12b, the shifting units 13a and 13b, the feeding unit 14, and the discharging units 15a and 15b are connected to a control unit unshown and are controlled by this control unit. The control unit includes an operation panel or a personal computer and the like, through which an operator can operate the fractionation apparatus 10.

(Liquid)

The dispersion liquid is a liquid containing a solvent and magnetic powder dispersed in the solvent. It is preferred that the dispersion liquid further contains a dispersant. This is because a dispersant makes it easier to disperse magnetic powder to a state of primary particles. The dispersion liquid may further contain additives other than the dispersant. An example of the magnetic powder includes powder of nano-magnetic particles such as hexagonal ferrite, cobalt ferrite, and ε-iron oxide (ε-$Fe_2O_3$). A usable example of the hexagonal ferrite includes barium ferrite, and part of barium may be substituted by at least one of strontium and calcium. Examples of the solvent for dispersing the magnetic powder include a ketone solvent such as acetone, methyl ethyl ketone, methyl isobutyl ketone, and cyclohexanone; an alcohol solvent such as methanol, ethanol, and propanol; an ester solvent such as methyl acetate, ethyl acetate, butyl acetate, propyl acetate, ethyl lactate, and ethylene glycol acetate; an ether solvent such as diethylene glycol dimethyl ether, 2-ethoxyethanol, tetrahydrofuran, and dioxane; an aromatic hydrocarbon solvent such as benzene, toluene, and xylene; and a halogenated hydrocarbon solvent such as methylene chloride, ethylene chloride, carbon tetrachloride, chloroform, and chlorobenzene. These solvents may be used independently, or two or more of these solvents may be combined.

Figure 6:
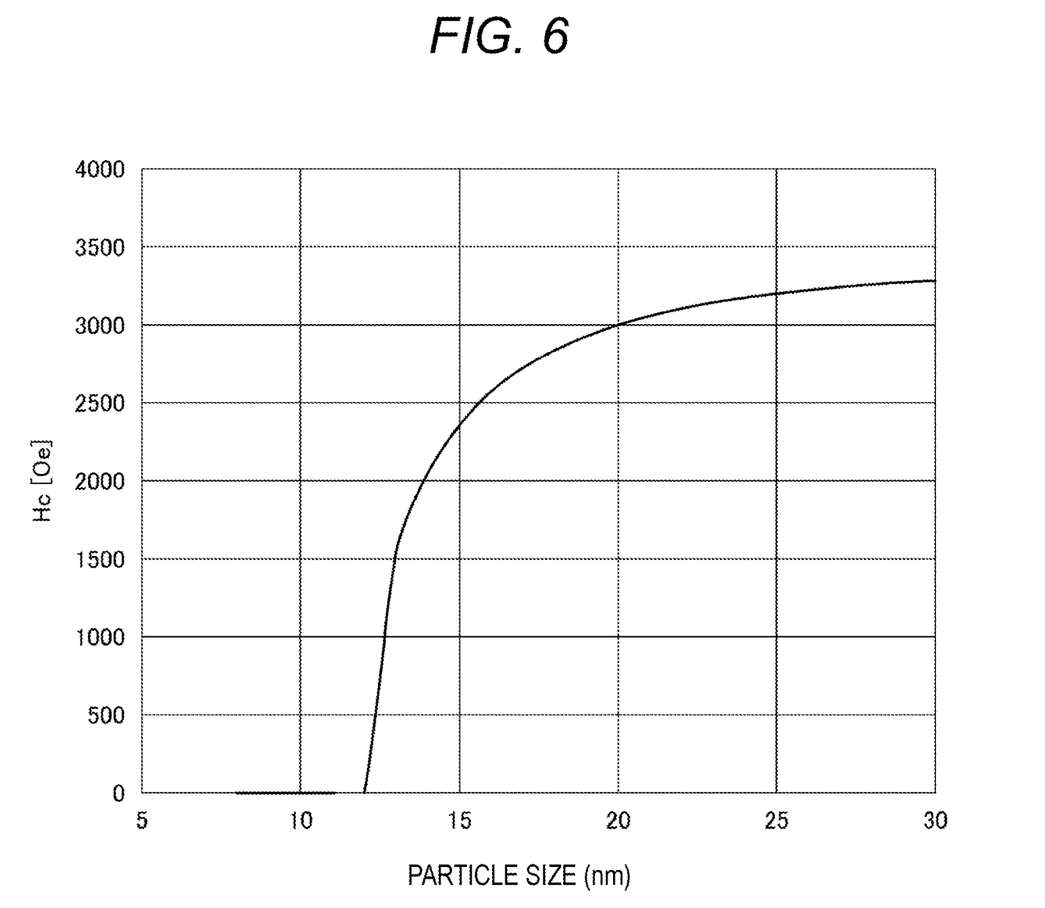
FIG. 6 is a graph showing an exemplary relationship between particle sizes and magnetic characteristics of barium ferrite magnetic powder.

The dispersion liquid contains magnetic powder with magnetic characteristics being largely degraded due to reduction in particle size (that is, magnetic powder showing superparamagnetism or showing magnetic characteristics close to superparamagnetism, hereinafter simply referred to as "superparamagnetic magnetic powder") and magnetic powder with magnetic characteristics not being largely degraded due to reduction in particle size (that is, magnetic powder not showing superparamagnetism or not showing magnetic characteristics close to superparamagnetism, hereinafter simply referred to as "ferromagnetic magnetic powder") (see FIG. 6).

(Storage Unit)

The storage unit 11 is a container having a cuboid shape. With regard to a distance between surfaces on both sides of the storage unit 11 respectively opposing the magnetic field application units 12a and 12b, the narrower it is, the more preferable. This is because such a narrow distance makes it efficient to apply a magnetic field to the dispersion liquid. The storage unit 11 has first and second regions R1 and R2. The first and second regions R1 and R2 are separable by a partition plate 17 serving as a separation unit. The feeding unit 14 is provided in an upper part of the first region R1 of the storage unit 11; the discharging unit 15a is provided at a bottom part of the first region R1 of the storage unit 11; and the discharging unit 15b is provided at a bottom part of the second region R2 of the storage unit 11.

(Magnetic Field Application Unit)

The magnetic field application units 12a and 12b separately oppose each other at a predetermined interval so as to sandwich the storage unit 11. The magnetic field application units 12a and 12b are electromagnets. The magnetic field application units 12a and 12b may be capable of applying either an AC magnetic field or a DC magnetic field but are preferably capable of applying an AC magnetic field from a viewpoint of preventing adhesion of the magnetic powder due to the magnetic field.

(Shifting Unit)

The shifting units 13a and 13b are linear motors and the like, and include linearly movable supporting units 13c and 13d, respectively. The magnetic field application units 12a and 12b are supported on the supporting units 13c and 13d, respectively. The shifting units 13a and 13b linearly shift the magnetic field application units 12a and 12b, respectively, along the surfaces on both sides of the storage unit 11 from one end to the other end of the storage unit 11, that is, from the region R1 to the region R2.

(Fractionation Method for Magnetic Powder)

Hereinafter described is an exemplary fractionation method for magnetic powder according to the first embodiment of the present technology.

First, a dispersion liquid with magnetic powder dispersed in a solvent is fed to the storage unit 11 through the feeding unit 14. Next, the magnetic field application units 12a and 12b positioned at one end of the storage unit 11 are driven to apply a magnetic field to the dispersion liquid from the surfaces on both sides of the storage unit 11. Next, while maintaining the application of the magnetic field, the shifting units 13a and 13b are driven to linearly shift the magnetic field application units 12a and 12b along the surfaces on both sides of the storage unit 11 from one end to the other end of the storage unit 11. With this shift, the positions where the magnetic field is applied are linearly shifted from one end to the other end of the storage unit 11, that is, from the first region R1 to the second region R2.

Ferromagnetic magnetic powder and superparamagnetic magnetic powder dispersed in the dispersion liquid have a large difference in force attracted by the magnetic field. In other words, the ferromagnetic magnetic powder of the magnetic powder dispersed in the dispersion liquid is attracted by the magnetic field more easily than the superparamagnetic magnetic powder is. Therefore, a large amount of ferromagnetic magnetic powder is likely to gather at the positions where the magnetic field is applied by the magnetic field application units 12a and 12b, whereas a large amount of superparamagnetic magnetic powder is likely to remain at the positions after passing of the applied magnetic field where no magnetic field is applied. Therefore, the dispersion liquid in the second region R2 contains more ferromagnetic magnetic powder than the dispersion liquid in the first region R1. In other words, the superparamagnetic magnetic powder is reduced in the dispersion liquid in the second region R2.

The magnetic field at the time of shifting the magnetic field application units 12a and 12b is preferably equal to or higher than an external magnetic field worth of 1/20 of coercive force Hc of the magnetic powder and equal to or lower than an external magnetic field worth of the coercive force Hc of the magnetic powder. A magnetic field under the foregoing lower limit may cause a decrease in effects of fractionating the magnetic powder due to the magnetic characteristics (coercive force Hc). On the other hand, a magnetic field over the foregoing upper limit causes an increase in magnetization induced by superparamagnetism and a decrease in difference between the magnetization of the superparamagnetic magnetic powder and that of the ferromagnetic magnetic powder, which may lead to a decrease in the effects of fractionation.

A frequency of the AC magnetic field at the time of shifting the magnetic field application units 12a and 12b is preferably 0.1 Hz or more and 100 Hz or less. A frequency under 0.1 Hz requires slowdown of shift speed at the time of shift, which may cause an increase in time required for fractionating the magnetic powder. On the other hand, a frequency over 100 Hz may cause an increase in eddy current loss.

Next, the partition plate 17 is inserted between the first and second regions R1 and R2 so as to spatially separate the first and second regions R1 and R2, and then, the magnetic field application units 12a and 12b and the shifting units 13a and 13b are stopped. Next, the dispersion liquid in the first region R1 is discharged through the discharging unit 15a, and the dispersion liquid in the second region R2 is discharged through the discharging unit 15b. Next, if required, the dispersion liquid discharged from each of the discharging units 15a and 15b may be individually dried so as to obtain magnetic powder.

(Effect)

In the first embodiment of the present technology, a magnetic field is applied to a dispersion liquid that contains magnetic powder dispersed therein, and positions where the magnetic field is applied to the dispersion liquid is relatively shifted from the first region R1 to the second region R2 of the storage unit 11. After the shift of the positions where the magnetic field is applied, the dispersion liquid in the first region R1 contains superparamagnetic magnetic powder of a concentration higher than that of the dispersion liquid in the second region R2, whereas the dispersion liquid in the second region R2 contains ferromagnetic magnetic powder of a concentration higher than that of the dispersion liquid in the first region R1. Therefore, after the first and second regions R1 and R2 are separately partitioned by the partition plate 17, the dispersion liquid in the first region R1 and the dispersion liquid in the second region R2 are discharged by the discharging units 15a and 15b, respectively, so that it is possible to fractionate the magnetic powder that contains the superparamagnetic magnetic powder reduced therein and the magnetic powder that contains the ferromagnetic magnetic powder reduced therein. In other words, it is possible to fractionate magnetic powder showing good magnetic characteristics and magnetic powder showing poor magnetic characteristics. Herein, the term "good magnetic characteristics" indicates good magnetic characteristics in terms of using magnetic powder for a recording layer of a magnetic recording medium. Specifically, the term indicates that coercive force Hc is good.

In the first embodiment of the present technology, the magnetic powder is fractionated, utilizing the fact that the ferromagnetic magnetic powder and the superparamagnetic magnetic powder are different in force attracted by a magnetic field, so that it is possible to fractionate the magnetic powder depending on magnetic characteristics instead of classifying the magnetic powder depending on particle sizes. Therefore, it is possible to fractionate the magnetic powders with magnetic characteristics being degraded due to factors other than variations in particle sizes.

A magnetic field smaller than the magnitude of a magnetic field required for saturation of magnetic powder generates a magnetic force corresponding to residual magnetizing components in the magnetic powder, and this magnetic force allows a region of higher magnetic field to attract the magnetic powder. At this time, a large difference in force is generated between the superparamagnetic magnetic powder and the ferromagnetic magnetic powder. Accordingly, removal of the magnetic powder far from the positions after the shift where the magnetic field is applied makes it possible to reduce the superparamagnetic components from the magnetic powder without relying on classification.

(Modification)

(First Modification)

In the first embodiment, such an example has been described that the magnetic field application units 12a and 12b are shifted with respect to the fixed storage unit 11. However, the shift of the magnetic field application units 12a and 12b with respect to the storage unit 11 may be a relative shift. In other words, the storage unit 11 may be shifted with respect to the fixed magnetic field application units 12a and 12b, or the storage unit 11 and the magnetic field application units 12a and 12b may be shifted mutually in different directions.

(Second Modification)

In the first embodiment, such an example has been described that the partition plate 17 serving as the separation unit is configured to separate the first and second regions R1 and R2. However, the storage unit 11 may include an automatic opening/closing unit between the first and second regions R1 and R2 so that first and second chambers include the first and second regions R1 and R2, respectively. In this case, an operation to open or close the opening/closing unit is controlled by the control unit unshown.

(Third Modification)

In the first embodiment, such an example has been described that the magnetic field application units 12a and 12b are moved from one end to the other end of the storage unit 11 so that the dispersion liquid is extracted at the other end or stop points of the magnetic field application units 12a and 12b. However, the magnetic field application units 12a and 12b may be stopped at a central part of the storage unit 11 as their final stop points, and the dispersion liquid in the central part may be extracted. Specifically, for example, after being shifted from one end to the other end of the storage unit 11, the magnetic field application units 12a and 12b may be returned to the central part of the storage unit 11 to extract the dispersion liquid in the central part. Alternatively, after being shifted from the central part to the one end of the storage unit 11, the magnetic field application units 12a and 12b may be shifted to the other end, and then, may be returned to the central part from the other end to extract the dispersion liquid in the central part. In this case, the storage unit 11 may have first to third regions, and each boundary between the first to third regions may be separable by the partition plate 17 serving as the separation unit.

2 Second Embodiment (Fractionation Apparatus for Magnetic Powder)

Figure 2:
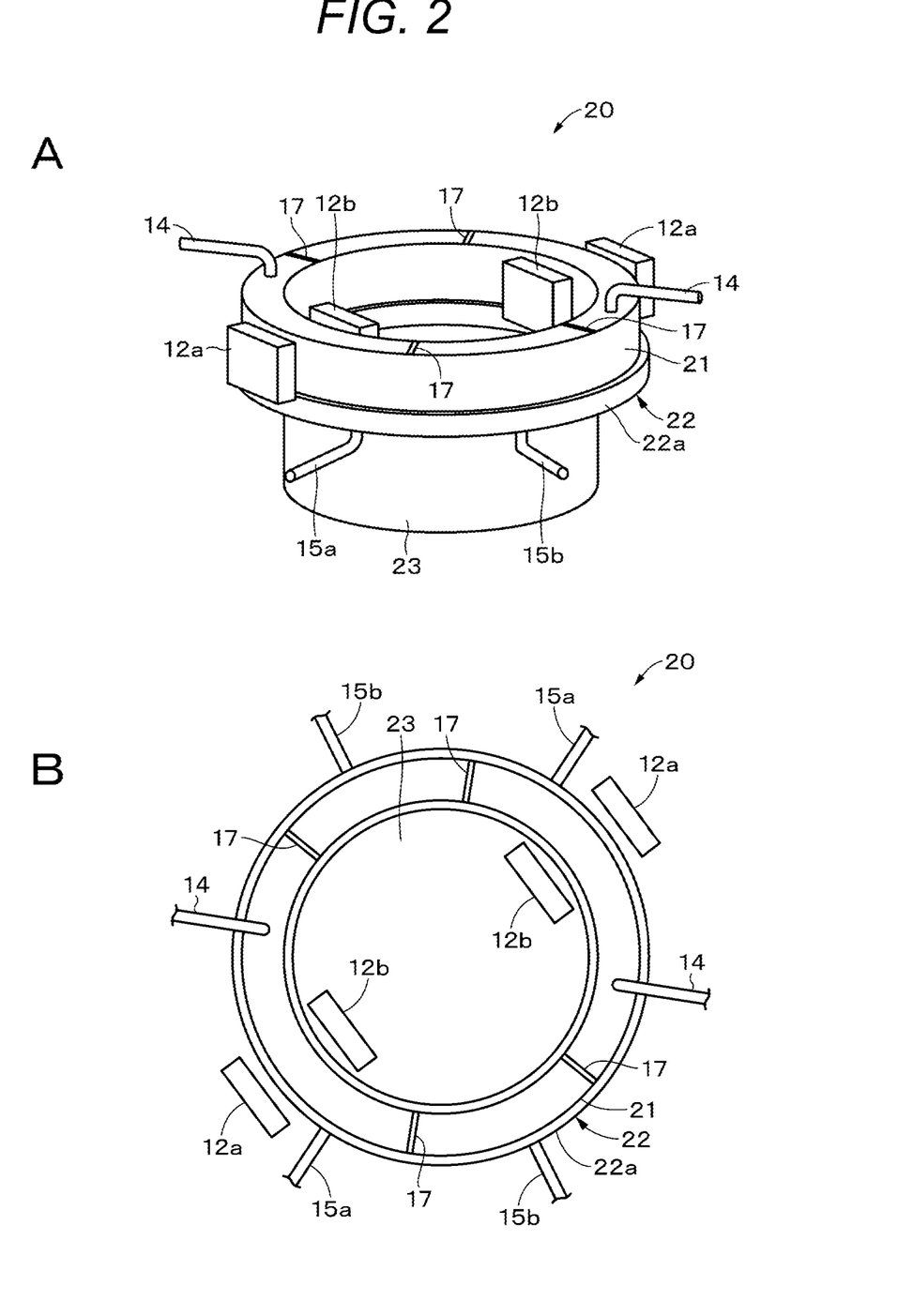
FIG. 2A is a perspective view showing a configuration example of a fractionation apparatus for magnetic recording-magnetic powder according to a second embodiment of the present technology.
FIG. 2B is a top view showing a configuration example of the fractionation apparatus for magnetic recording-magnetic powder according to the second embodiment of the present technology.

As shown in FIGS. 2A and 2B, a fractionation apparatus 20 for magnetic powder according to a second embodiment of the present technology includes a cylindrical storage unit 21, and a shifting unit 22 which shifts magnetic field application units 12a and 12b along a cylindrical surface of the storage unit 21. The storage unit 21, the magnetic field application units 12a and 12b, and the shifting unit 22 are supported by a supporting base 23. In the second embodiment, it should be noted that those similar to the parts in the first embodiment are denoted by the same reference numerals, and description thereof will be omitted. The magnetic field application units 12a and 12b, the shifting unit 22, a feeding unit 14, and discharging units 15a and 15b are connected to a control unit unshown and are controlled by this control unit.

The storage unit 21 has two first regions R1 and two second regions R2. The first and second regions R1 and R2 are alternately and repeatedly arranged in a circumferential direction of the storage unit 21. In the storage unit 21, the first and second regions R1 and R2 are separable by a partition plate 17.

The shifting unit 22 includes a ring-shaped table 22a that rotates, and the storage unit 21 is fixed on this table 22a. The storage unit 21 rotatably shifts with respect to the fixed magnetic field application units 12a and 12b.

(Fractionation Method for Magnetic Powder)

A fractionation method for magnetic powder according to the second embodiment is similar to the method according to the first embodiment except that the cylindrical storage unit 21 rotatably shifts with respect to the fixed magnetic field application units 12a and 12b and that magnetic powder is fractionated using two first regions R1 and two second regions R2. It should be noted that the magnetic field application units 12a and 12b preferably move over the entire first regions R1, and then, to the second regions R2.

(Effect)

In the second embodiment, the magnetic powder is fractionated using the two first regions R1 and the two second regions R2 set in the cylindrical storage unit 21, so that it is possible to fractionate the magnetic powder in shorter time and in a larger amount than in the first embodiment. In other words, it is possible to improve an efficiency in fractionating the magnetic powder.

(Modification)

(First Modification)

In the second embodiment, such an example has been described that the cylindrical storage unit 21 includes the first and second regions R1 two by two, but the storage unit 2 may include three or more first and second regions R1 and R2.

3 Third Embodiment (Fractionation Apparatus for Magnetic Powder)

Figure 3:
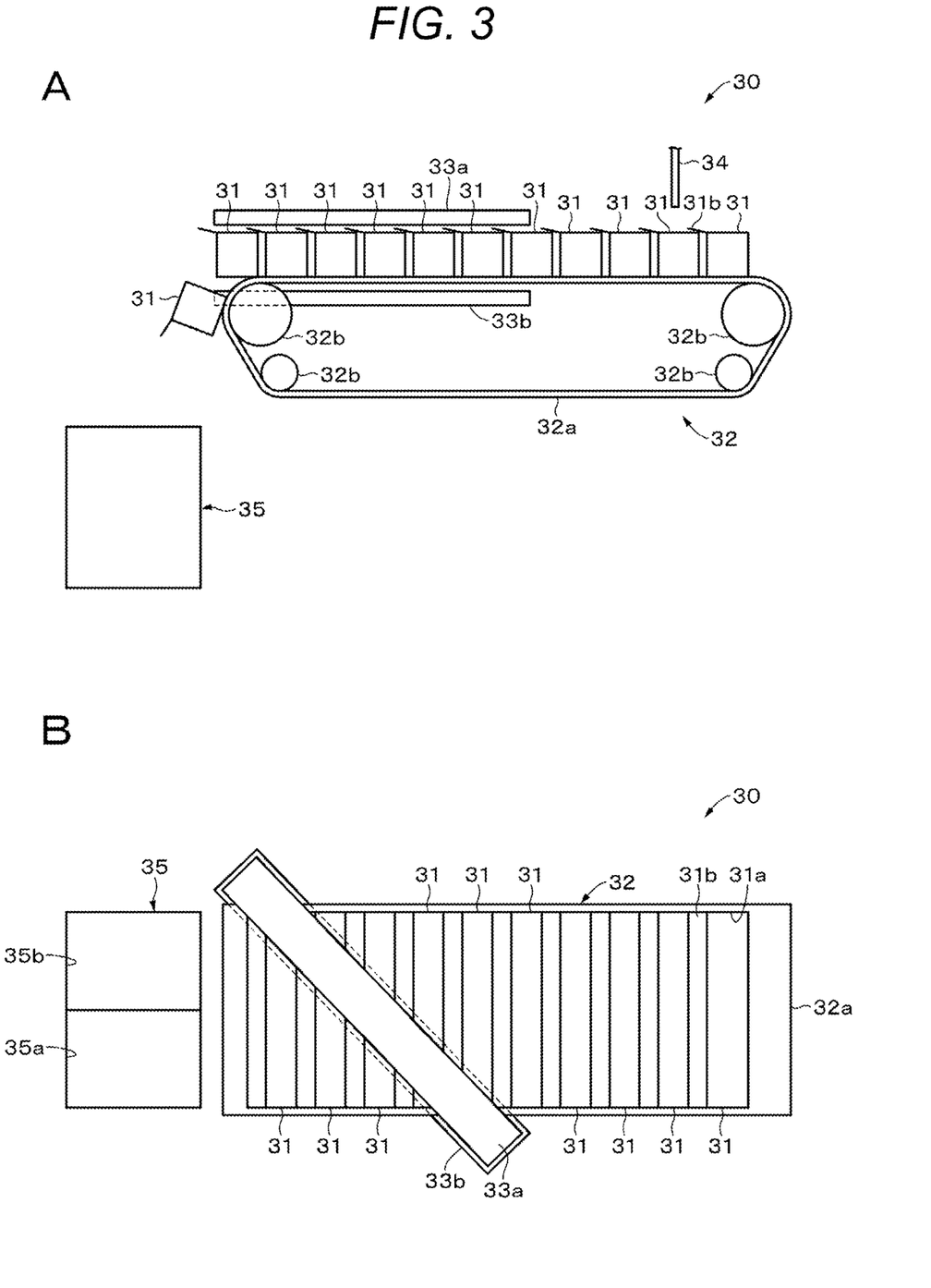
FIG. 3A is a side view showing a configuration example of a fractionation apparatus for magnetic recording-magnetic powder according to a third embodiment of the present technology.
FIG. 3B is a top view showing a configuration example of the fractionation apparatus for magnetic recording-magnetic powder according to the third embodiment of the present technology.

As shown in FIG. 3, a magnetic powder fractionation apparatus 30 according to a third embodiment of the present technology includes a shifting unit 32 which shifts a plurality of storage units 31 that stores a dispersion liquid; a pair of magnetic field application units 33a and 33b which applies a magnetic field to the dispersion liquid stored in each storage unit 31 to be shifted; a feeding unit 34 which feeds the dispersion liquid to each storage unit 31; and a collection unit 35 which collects the dispersion liquid shifted by each storage unit 31. The shifting unit 32, the magnetic field application units 33a and 33b, and the feeding unit 34 are connected to a control unit unshown and are controlled by this control unit.

(Storage Unit)

Each storage unit 31 is a cuboid container with one surface being opened to form an opened portion 31a. One side of the opened portion 31a in each storage unit 31 is provided with a rectangular extending portion 31b extendingly disposed in an outer side of the opened portion 31a. When one storage unit 31 is supplied to the shifting unit 32, it is supplied in such a manner that the opened portion 31a is placed on an upper side and the extending portion 31b is positioned between the adjacent storage units 31. With this arrangement, when the dispersion liquid is fed to one storage unit 31 by the feeding unit 34, the extending portion 31b prevents the dispersion liquid from spilling between the adjacent storage units 31.

(Shifting Unit)

The shifting unit 32 is a carrier device such as a belt conveyor, including a belt 32a and a plurality of rollers 32b.

(Magnetic Field Application Unit)

The magnetic field application units 33a and 33b are provided in a shifting path along which the storage units 31 are shifted. The magnetic field application units 33a and 33b have an elongated shape and are separately provided in parallel at a predetermined interval so as to allow the storage units 31 shifted by the shifting unit 32 to pass between the magnetic field application units 33a and 33b.

The magnetic field application units 33a and 33b are arranged obliquely with respect to a direction of the shift of the storage units 31, so that positions where the magnetic field is applied shift from one end to the other end of the storage units 31 along with the shift of the storage units 31.

(Feeding Unit)

The feeding unit 34 feeds the dispersion liquid through the opened portion 31a to each storage unit 31 shifted by the shifting unit 32.

(Collection Unit)

The collection unit 35 collects the dispersion liquid stored in each storage unit 31 shifted by the shifting unit 32. The collection unit 35 includes a first collection unit 35a and a second collection unit 35b. The second collection unit 35b collects the dispersion liquid on a side close to the other end of the storage units 31, that is, the dispersion liquid at the positions where the magnetic field is applied. The first collection unit 35a collects the dispersion liquid on a side close to one end of the storage units 31, that is, the dispersion liquid at positions where no magnetic field is applied.

(Fractionation Method for Magnetic Powder)

First, when one storage unit 31 is supplied to one end of the shifting path of the shifting unit 32, the shifting unit 32 shifts this storage unit 31 by a predetermined distance and stops the same. After the stop, the next storage unit 31 is fed to one end of the shifting path of the shifting unit 32, and similarly, the shifting unit 32 shifts this storage unit 31 by the predetermined distance and stops the same. By alternately repeating this shift-and-stop operation, the storage units 31 are sequentially shifted from one end to the other end of the shifting path.

Next, when one storage unit 31 is stopped at a position below the feeding unit 34, the feeding unit 34 feeds the dispersion liquid from the opened portion 31a. After the dispersion liquid is completely fed, the storage unit 31 is shifted, and a magnetic field is applied to one end of the storage unit 31 by the magnetic field application units 33a and 33b. Then, along with the shift of the feeding unit 34, positions where the magnetic field is applied by the magnetic field application units 33a and 33b shift from one end to the other end of the storage unit 31.

When the storage unit 31 reaches the other end of the shifting path, the storage unit 31 falls. With this arrangement, in the dispersion liquid stored in the storage unit 31, the dispersion liquid from a central part to one end of the storage unit 31 (that is, the dispersion liquid at the positions where no magnetic field is applied) is collected by the first collection unit 35a. On the other hand, the dispersion liquid from the central part to the other end of the storage unit 31 (that is, the dispersion liquid at the positions where the magnetic field is applied) is collected by the second collection unit 35b. Next, if required, the dispersion liquid collected by each of the first and second collection units 35a and 35b may be individually dried so as to obtain magnetic powder.

(Effect)

In the third embodiment, while the plurality of storage units 31 shifts, the magnetic powder is fractionated by the magnetic field application units 33a and 33b arranged obliquely with respect to the direction of the shift of the storage units 31. Therefore, it is possible to fractionate the magnetic powder in shorter time and in a larger amount than in the first embodiment. In other words, it is possible to improve an efficiency in fractionating the magnetic powder.

(Modification)

(First Modification)

Instead of the elongated magnetic field application units 33a and 33b, a plurality of magnetic field application units arranged obliquely with respect to the direction of the shift of the storage units 31 may be provided.

(Second Modification)

A collection device such as an articulated robot may be provided near the other end of the shifting path of the shifting unit 32, so that each storage unit 31 falling from one end of the shifting unit may be collected by the collection device.

(Third Modification)

A tilting device such as an articulated robot may be provided near the other end of the shifting path of the shifting unit 32, so that each storage unit 31 shifted to one end of the shifting path of the shifting unit 32 may be tilted by the tilting device and that the dispersion liquid flowing down from each storage unit 31 may be collected by the collection unit 35.

(Fourth Modification)

The plurality of storage units 31 may be fixed to the belt 32a, and the plurality of storage units 31 may be used repeatedly.

4. Fourth Embodiment (Configuration of Magnetic Recording Medium)

Figure 4:
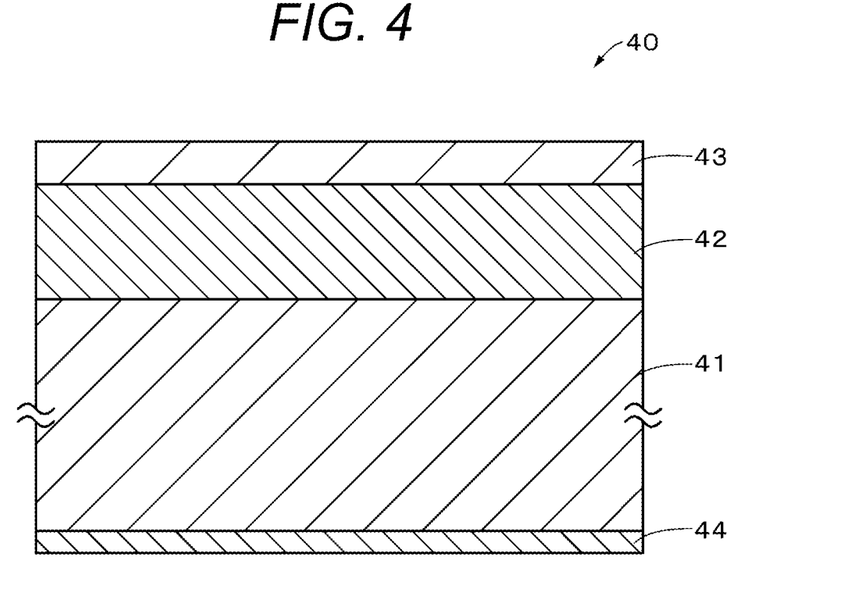
FIG. 4 is a cross-sectional view showing a configuration example of a magnetic recording medium according to a fourth embodiment of the present technology.

As shown in FIG. 4, a magnetic recording medium 40 according to a fourth embodiment of the present technology includes a non-magnetic support 41, an underlayer 42 disposed on one principal surface of the non-magnetic support 41, and a recording layer 43 disposed on the underlayer 42. If required, the magnetic recording medium 40 may further include a back coating layer 44 disposed on the other principal surface of the non-magnetic support 41. Furthermore, if required, the magnetic recording medium 40 may further include a protective layer, a lubricant layer, and the like provided on the recording layer 43.

(Method of Producing Magnetic Recording Medium)

Hereinafter described is an exemplary method of producing a magnetic recording medium according to the fourth embodiment of the present technology.

(Coating Material Adjusting Process)

First, non-magnetic powder and a binder or the like are kneaded into a solvent and dispersed therein so as to prepare an underlayer forming-coating material. Next, magnetic powder and a binder or the like are kneaded into a solvent and dispersed therein so as to prepare a recording layer forming-coating material. With regard to the magnetic powder, what is used herein is one fractionated by the fractionation method for magnetic powder according to any one of the first to third embodiments and showing good magnetic characteristics. It should be noted that dispersion liquid which is not dried may also be used. Next, if required, a binder, inorganic particles, a lubricant, and the like are kneaded into a solvent and dispersed therein so as to prepare a back coating layer forming-coating material. For example, the following exemplary solvents, dispersing devices, and kneading devices are employable to prepare the underlayer forming-coating material, the recording layer forming-coating material, and the back coating layer forming-coating material.

Examples of the solvents used for preparing the foregoing coating materials include a ketone solvent such as acetone, methyl ethyl ketone, methyl isobutyl ketone, and cyclohexanone; an alcohol solvent such as methanol, ethanol, and propanol; an ester solvent such as methyl acetate, ethyl acetate, butyl acetate, propyl acetate, ethyl lactate, and ethylene glycol acetate; an ether solvent such as diethylene glycol dimethyl ether, 2-ethoxyethanol, tetrahydrofuran, and dioxane; an aromatic hydrocarbon solvent such as benzene, toluene, and xylene; and a halogenated hydrocarbon solvent such as methylene chloride, ethylene chloride, carbon tetrachloride, chloroform, and chlorobenzene. These solvents may be used independently, or two or more of these solvents may be combined.

Examples of the kneading device used for preparing the foregoing coating materials include a twin-screw continuous kneading device, a twin-screw continuous kneading device capable of diluting in multiple stages, a kneader, a pressure kneader, and a roll kneader, but the kneading device is not particularly limited to these devices. Furthermore, examples of the dispersing device used for preparing the foregoing coating materials include a roll mill, a ball mill, a horizontal sand mill, a vertical sand mill, a spike mill, a pin mill, a tower mill, a pearl mill (for example, "DCP mill" manufactured by Nippon Eirich Co., Ltd.), a homogenizer, and an acoustic wave disperser, but the dispersing device is not particularly limited to these devices.

(Underlayer Forming Process)

Next, the underlayer forming-coating material is applied to one principal surface of the non-magnetic support 41 and dried to form the underlayer 42 on one principal surface of the non-magnetic support 41.

(Recording Layer Forming Process)

Next, the recording layer forming-coating material is applied to the underlayer 42 and dried to form the recording layer 43 on the underlayer 42.

(Back Coating Layer Forming Process)

Next, if required, the back coating layer forming-coating material is applied to the other principal surface of the non-magnetic support 41 and dried to form the back coating layer 44 on the other principal surface of the non-magnetic support 41. With these processes, a wide-width magnetic recording medium 40 can be obtained.

(Calendering and Cutting Process)

Next, the obtained wide-width magnetic recording medium 40 is rewound about a large-diameter core and subjected to cure treatment. Next, the wide-width magnetic recording medium 40 is calendered and then cut into a predetermined width. With this process, an intended magnetic recording medium 40 can be obtained. It should be noted that the process of forming the back coating layer 44 may be followed after the calendering.

(Effect)

In the fourth embodiment of the present technology, the recording layer 43 is formed, using the magnetic powder fractionated by the fractionation method for magnetic powder according to any one of the first to third embodiments and showing good magnetic characteristics. This arrangement clearly defines a region of magnetization reversal in a short-wavelength region in the magnetic recording, which improves a S/N ratio.

EXAMPLE

Figure 5:
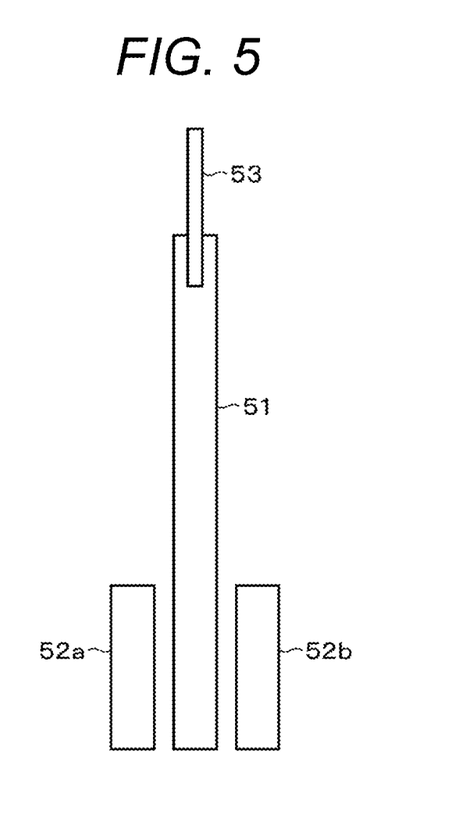
FIG. 5 is a side view showing a configuration of a fractionation apparatus for magnetic recording-magnetic powder according to Example.

Hereinafter, the present technology will be specifically described by Example with reference to FIG. 5, but the present technology is not limited to this Example.

(Example)

First, barium ferrite magnetic powder having holding power Hc of 2700 Oe was dispersed in a solvent to prepare a dispersion liquid. At this time, the magnetic powder was dispersed with a dispersant and the like into a state of primary particles. Next, this dispersion liquid was fed to a vertical container 51, and an AC magnetic field was applied to the dispersion liquid by electromagnets 52a and 52b from side surfaces of the vertical container 51. At this time, a frequency of the AC magnetic field was set at 10 Hz, and the magnitude of the magnetic field was set at 1.1 kG (Gauss). Next, while the AC magnetic field was kept applied to the dispersion liquid, the electromagnets 52a and 52b were shifted from a bottom part to an upper part of the vertical container 51. After the shift, the dispersion liquid in the upper part of the vertical container 51, to which the AC magnetic field was kept applied, was sampled by a pipette 53.

Next, magnetic characteristics were studied with regard to the barium ferrite magnetic powder contained in the sampled dispersion liquid and the barium ferrite magnetic powder contained in the remaining dispersion liquid after the sampling. As a result, it was found that coercive force Hc of the former magnetic powder was 2840 Oe, while coercive force Hc of the latter magnetic powder was 2500, indicating that low Hc components were reduced by fractionation.

Although the embodiments of the present technology have been specifically described, the present technology is not limited to the embodiments, and may be modified in various ways on the basis of the technical idea of the present technology.

For example, the configurations, methods, processes, shapes, materials, numerical values, and the like mentioned in the embodiments are examples only, and if required, different configurations, methods, processes, shapes, materials, numerical values, and the like may be used.

Furthermore, the configurations, methods, processes, shapes, materials, numerical values, and the like of the embodiments can be combined with each other as long as they do not deviate from the gist of the present technology.

Still further, the following configurations are employable in the present technology.

(1)
A fractionation method for magnetic recording-magnetic powder, the method including:
applying a magnetic field to a liquid that contains magnetic recording-magnetic powder dispersed therein; and
relatively shifting a position where the magnetic field is applied to the liquid.

(2)
The fractionation method for magnetic recording-magnetic powder according to (1), the method further including extracting part of the liquid that remains at the position after the shift where the magnetic field is applied.

(3)
The fractionation method for magnetic recording-magnetic powder according to (2), the method further including:
separating part of the liquid so that the part includes the liquid at the position after the shift where the magnetic field is applied; and
extracting part of the liquid after the separation.

(4)
The fractionation method for magnetic recording-magnetic powder according to (1),
in which the liquid is stored in a storage unit including at least a first chamber and a second chamber, and
the shift of the position where the magnetic field is applied is a shift from the first chamber to the second chamber.

(5)
The fractionation method for magnetic recording-magnetic powder according to (4), the method further including:
separating the first chamber and the second chamber after the shift; and
extracting a liquid in the second chamber.

(6)
The fractionation method for magnetic recording-magnetic powder according to (1),
in which the liquid is stored in a storage unit, and
the shift is a shift from one end to another end of the storage unit.

(7)
The fractionation method for magnetic recording-magnetic powder according to (1), in which the magnetic field is applied by a magnetic field application unit held obliquely with respect to a direction of the shift.

(8)
The fractionation method for magnetic recording-magnetic powder according to any one of (1) to (7), in which the magnetic field at a time of the shift is equal to or higher than an external magnetic field worth of 1/20 of coercive force Hc of the magnetic recording-magnetic powder and equal to or lower than an external magnetic field worth of coercive force Hc of the magnetic recording-magnetic powder.

(9)
The fractionation method for magnetic recording-magnetic powder according to any one of (1) to (8), in which the magnetic field is an AC magnetic field.

(10)
The fractionation method for magnetic recording-magnetic powder according to (9), in which the AC magnetic field at a time of the shift has a frequency of 0.1 Hz or more and 100 Hz or less.

(11)
The fractionation method for magnetic recording-magnetic powder according to any one of (1) to (10), in which the magnetic recording-magnetic powder is hexagonal ferrite magnetic powder.

(12)
A fractionation apparatus for magnetic recording-magnetic powder, the apparatus including:
a storage unit configured to store a liquid that contains magnetic recording-magnetic powder dispersed therein;
a magnetic field application unit configured to apply a magnetic field to the liquid; and
a shifting unit configured to shift at least one of the storage unit and the magnetic field application unit so as to relatively shift a position where the magnetic field is applied to the liquid.

(13)
A fractionation apparatus for magnetic recording-magnetic powder, the apparatus including:
a magnetic field application unit configured to apply a magnetic field to a liquid that is stored in a storage unit and that contains magnetic recording-magnetic powder dispersed therein; and
a shifting unit configured to shift at least one of the storage unit and the magnetic field application unit so as to relatively shift a position where the magnetic field is applied to the liquid.

(14)
The fractionation apparatus for magnetic recording-magnetic powder according to (12),
in which the storage unit is configured to be separable at a part of the storage unit, and
the shifting unit is configured to shift the position where the magnetic field is applied from an outer side of the part of the storage unit to the part of the storage unit.

(15)
The fractionation apparatus for magnetic recording-magnetic powder according to (14), the apparatus further including a discharging unit configured to discharge a dispersion liquid in the part of the storage unit.

(16)
The fractionation apparatus for magnetic recording-magnetic powder according to (12),
in which the storage unit includes at least a first chamber and a second chamber, and
the shifting unit is configured to shift the position where the magnetic field is applied from the first chamber to the second chamber.

(17)
The fractionation apparatus for magnetic recording-magnetic powder according to (13), in which the magnetic field application unit is held obliquely with respect to a direction of the shift, so that the position where the magnetic field is applied shifts from one end to another end of the storage unit along with the shift.

(18)
The fractionation apparatus for magnetic recording-magnetic powder according to any one of (12) to (17), in which the storage unit has a cuboid shape or a cylindrical shape.

(19)
A method of producing a magnetic recording medium, the method including:
applying a magnetic field to a liquid that contains magnetic recording-magnetic powder dispersed therein;
relatively shifting a position where the magnetic field is applied to the liquid;
extracting part of the liquid that remains at the position after the shift where the magnetic field is applied; and
forming a magnetic layer using the magnetic recording-magnetic powder contained in the extracted liquid.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Fractionation apparatus for magnetic powder
11, 21, 31 Storage unit
12a, 12, 33a, 33b Magnetic field application unit
13a, 13b, 21 Shifting unit
R1 First region
R2 Second region

The invention claimed is:

1. A fractionation method for magnetic recording-magnetic powder, the method comprising:
   applying a magnetic field to a liquid that contains magnetic recording-magnetic powder dispersed therein, wherein the liquid is stored in a storage unit;
   relatively shifting a position where the magnetic field is applied to the liquid; and
   separating the storage unit into two parts after the shift.

2. The fractionation method for magnetic recording-magnetic powder according to claim 1, the method further comprising extracting part of the liquid that remains after the shift where the magnetic field is applied.

3. The fractionation method for magnetic recording-magnetic powder according to claim 2, the method further comprising:
   separating part of the liquid so that the part includes the liquid after the shift where the magnetic field is applied; and
   extracting the part of the liquid after the separation.

4. The fractionation method for magnetic recording-magnetic powder according to claim 1,
   wherein the shift is a shift from one end to another end of the storage unit.

5. The fractionation method for magnetic recording-magnetic powder according to claim 1, wherein the magnetic field is applied by a magnetic field application unit held obliquely with respect to a direction of the shift.

6. The fractionation method for magnetic recording-magnetic powder according to claim 1, wherein the magnetic field at a time of the shift is equal to or higher than an external magnetic field worth of 1/20 of coercive force Hc of the magnetic recording-magnetic powder and equal to or lower than an external magnetic field worth of coercive force Hc of the magnetic recording-magnetic powder.

7. The fractionation method for magnetic recording-magnetic powder according to claim 1, wherein the magnetic field is an AC magnetic field.

8. The fractionation method for magnetic recording-magnetic powder according to claim 7, wherein the AC magnetic field at a time of the shift has a frequency of 0.1 Hz or more and 100 Hz or less.

9. The fractionation method for magnetic recording-magnetic powder according to claim 1, wherein the magnetic recording-magnetic powder is hexagonal ferrite magnetic powder.

10. A fractionation method for magnetic recording-magnetic powder, the method comprising:
    applying a magnetic field to a liquid that contains magnetic recording-magnetic powder dispersed therein; and
    relatively shifting a position where the magnetic field is applied to the liquid, wherein the liquid is stored in a storage unit including at least a first chamber and a second chamber, and the shift of the position where the magnetic field is applied is a shift from the first chamber to the second chamber;
    separating the first chamber and the second chamber after the shift; and
    extracting a liquid in the second chamber.

* * * * *